(12) United States Patent
Lee

(10) Patent No.: US 12,090,936 B2
(45) Date of Patent: Sep. 17, 2024

(54) ELECTRONIC DEVICE FOR CONTROLLING INTERNAL SYSTEM OF VEHICLE BY USING WIRELESS DATA COMMUNICATION ID AND OPERATING METHOD OF THE ELECTRONIC DEVICE

(71) Applicant: Samsung Electronics Co., Ltd., Gyeonggi-do (KR)

(72) Inventor: Jaewoong Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 544 days.

(21) Appl. No.: 17/182,372

(22) Filed: Feb. 23, 2021

(65) Prior Publication Data
US 2021/0261073 A1    Aug. 26, 2021

(30) Foreign Application Priority Data
Feb. 26, 2020    (KR) .................. 10-2020-0023831

(51) Int. Cl.
*H04W 76/10*    (2018.01)
*B60K 35/00*    (2024.01)
(Continued)

(52) U.S. Cl.
CPC .......... *B60R 16/0231* (2013.01); *B60K 35/00* (2013.01); *G06F 3/0482* (2013.01);
(Continued)

(58) Field of Classification Search
None
See application file for complete search history.

(56) References Cited

U.S. PATENT DOCUMENTS

| 6,754,321 B1 * | 6/2004 | Innes | H04L 61/35 |
| | | | 707/999.103 |
| 9,743,441 B2 * | 8/2017 | O Donnabhain | H04W 12/062 |

(Continued)

FOREIGN PATENT DOCUMENTS

| KR | 10-1662177 B1 | 10/2016 |
| KR | 10-1846728 B1 | 4/2018 |
| KR | 10-2019-0135240 A | 12/2019 |

OTHER PUBLICATIONS

Gary E Burnett, J Mark Porter, Ubiquitous computing within cars: designing controls for non-visual use, International Journal of Human-Computer Studies, vol. 55, Issue 4, 2001 pp. 521-531, ISSN 1071-5819. https://doi.org/10.1006/ijhc.2001.0482 (Year: 2001).*

(Continued)

*Primary Examiner* — Adam M Queler
*Assistant Examiner* — Nathan K Shrewsbury
(74) *Attorney, Agent, or Firm* — Cha & Reiter, LLC

(57) ABSTRACT

Disclosed are an electronic device for controlling an internal system of a vehicle by using a wireless data communication identifier (ID) of a mobile device, and an operating method of the electronic device. Also disclosed are an electronic device which obtains environment configuration information of the vehicle configured by a user input by using a wireless data communication identifier (ID) (e.g., a Bluetooth ID or a Wireless Fidelity (WiFi) device name) of the mobile device, and controls a configuration of the internal system of the vehicle by using the obtained environment configuration information, and an operating method of the electronic device.

20 Claims, 11 Drawing Sheets

(51) Int. Cl.
*B60K 35/22* (2024.01)
*B60K 35/26* (2024.01)
*B60R 16/023* (2006.01)
*G06F 3/0482* (2013.01)
*H04L 41/0816* (2022.01)
*H04W 4/80* (2018.01)
*H04W 84/12* (2009.01)

(52) U.S. Cl.
CPC ......... *H04L 41/0816* (2013.01); *H04W 76/10* (2018.02); *B60K 35/22* (2024.01); *B60K 35/26* (2024.01); *H04W 4/80* (2018.02); *H04W 84/12* (2013.01)

(56) References Cited

U.S. PATENT DOCUMENTS

| | | | | |
|---|---|---|---|---|
| 10,732,925 | B2* | 8/2020 | Daman | H04H 20/62 |
| 2012/0200407 | A1* | 8/2012 | Morris | B60K 35/00 |
| | | | | 340/439 |
| 2012/0302219 | A1* | 11/2012 | Vang | H04W 4/023 |
| | | | | 455/414.1 |
| 2014/0025253 | A1* | 1/2014 | Rybak | G07C 5/085 |
| | | | | 701/32.7 |
| 2014/0133656 | A1 | 5/2014 | Wurster et al. | |
| 2016/0066127 | A1* | 3/2016 | Choi | H04W 4/80 |
| | | | | 455/41.2 |
| 2016/0381726 | A1* | 12/2016 | O Donnabhain | H04W 12/062 |
| | | | | 370/329 |
| 2017/0120846 | A1* | 5/2017 | Gupta | B60R 16/023 |
| 2017/0180929 | A1* | 6/2017 | Cavendish | H04W 4/023 |
| 2017/0200334 | A1* | 7/2017 | Buttolo | G07C 9/21 |
| 2018/0130449 | A1* | 5/2018 | Jeon | H04L 63/105 |
| 2018/0217828 | A1* | 8/2018 | Madrid | H04L 63/123 |
| 2018/0304903 | A1* | 10/2018 | Sinaguinan | B60W 50/0098 |
| 2019/0136815 | A1* | 5/2019 | Rhodes | H04L 67/12 |
| 2020/0245234 | A1* | 7/2020 | Omiya | H04L 12/46 |
| 2021/0041950 | A1* | 2/2021 | von und zu Liechtenstein | |
| | | | | G06F 3/013 |
| 2021/0261073 | A1* | 8/2021 | Lee | B60R 16/037 |

OTHER PUBLICATIONS

T. Suzuki, T. Fujii, K. Yokota, H. Asama, H. Kaetsu and I. Endo, "Teleoperation of multiple robots through the Internet," Proceedings 5th IEEE International Workshop on Robot and Human Communication. RO-MAN'96 Tsukuba, Tsukuba, Japan, 1996, pp. 84-89 (Year: 1996).*

Smartphone-Based Vehicle Telematics: A Ten-Year Anniversary, Johan Wahlstrom, IEEE Transactions On Intelligent Transportation Systems, vol. 18, No. 10, Oct. 2017 (Year: 2017).*

European Search Report dated Jun. 16, 2021.

Korean Office Action dated Jun. 13, 2024.

* cited by examiner

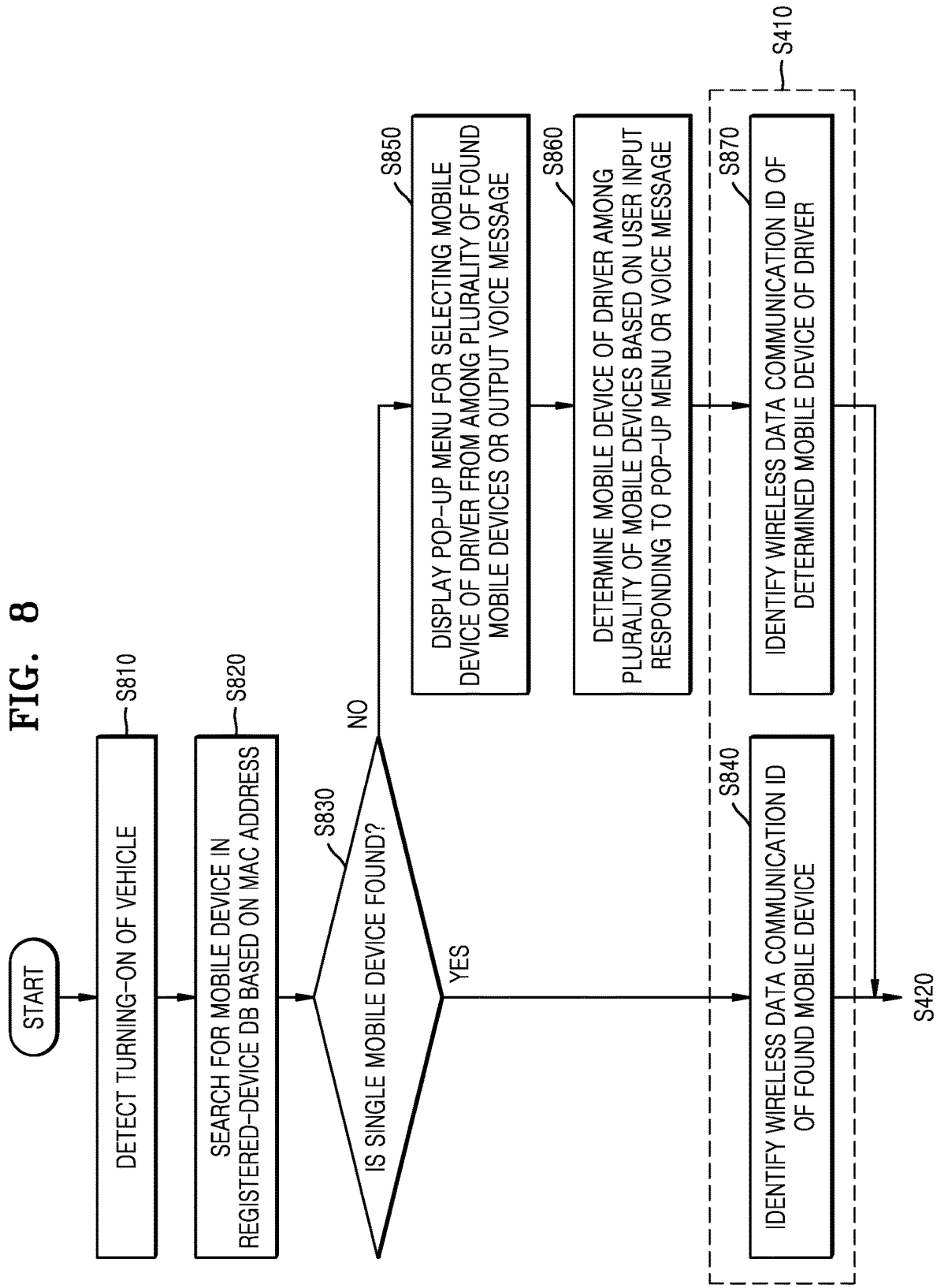

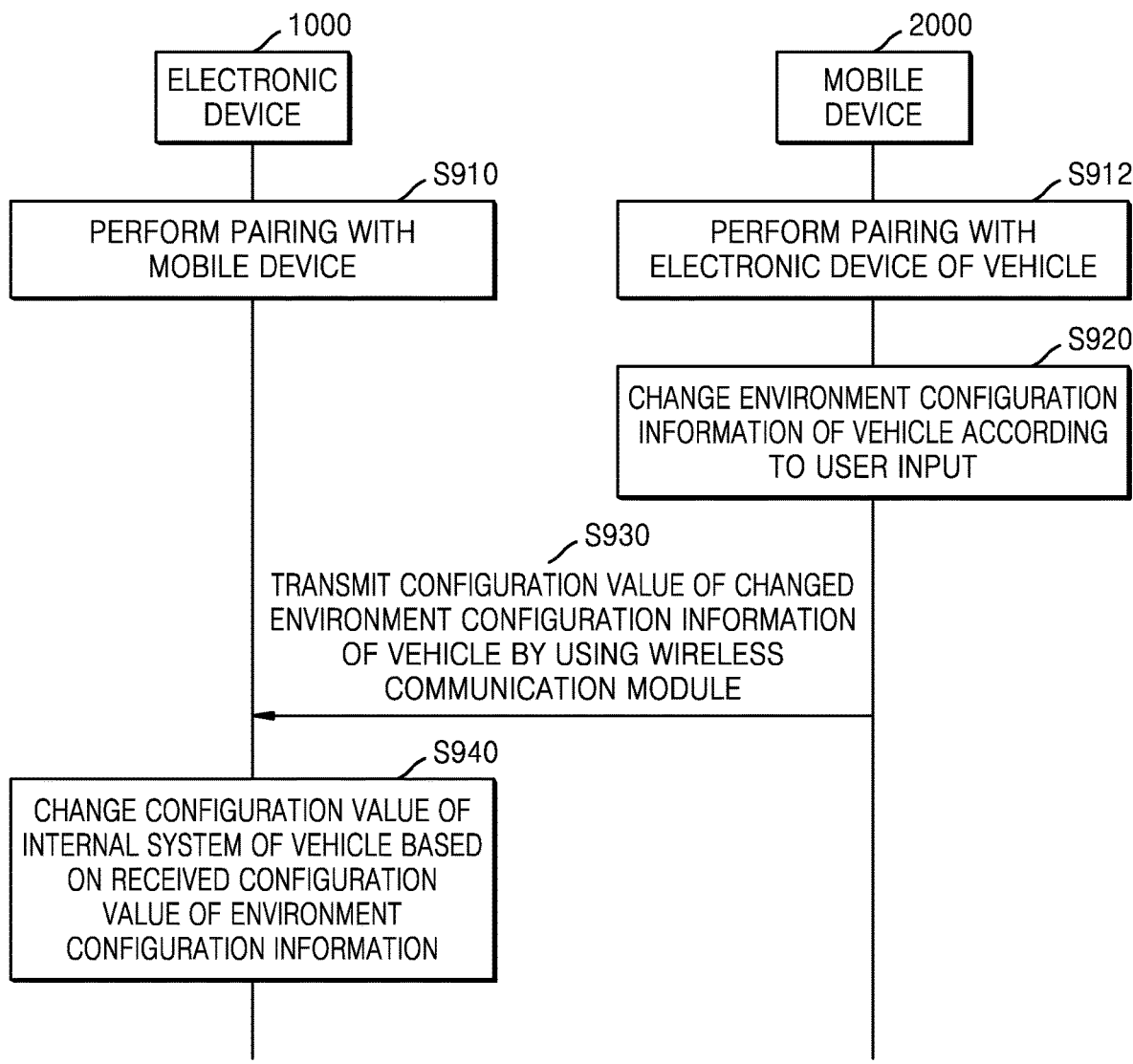

ELECTRONIC DEVICE FOR CONTROLLING INTERNAL SYSTEM OF VEHICLE BY USING WIRELESS DATA COMMUNICATION ID AND OPERATING METHOD OF THE ELECTRONIC DEVICE

CROSS-REFERENCE TO RELATED APPLICATION

This application is based on and claims priority under 35 U.S.C. § 119 to Korean Patent Application No. 10-2020-0023831, filed on Feb. 26, 2020, in the Korean Intellectual Property Office, the disclosure of which is incorporated by reference herein in its entirety.

BACKGROUND

1. Field

One or more embodiments in the instant disclosure generally relate to an electronic device for controlling an internal system of a vehicle by using a wireless data communication identifier (ID) of a mobile device, and an operating method of the electronic device.

2. Description of Related Art

Wireless communication technologies have come into widespread use, and mobile devices providing short-range wireless communication such as Bluetooth or Wireless Fidelity (WiFi) have been popularized. Currently, vehicles have also been designed to provide various functions in addition to simple driving function to drivers in order to provide convenience to the drivers, and a user may control various functions of the vehicle depending on his or her preference. The vehicle manufacturer or servicer may provide corresponding services to control the various functions of the vehicles through the user's mobile device to improve user convenience.

The user may configure an internal system of the vehicle, such as the vehicle's environment control (e.g. air conditioning) system, through an application program of a mobile device which transmits environment configuration information to an electronic device mounted on the vehicle by using a mobile network such as Long Term Evolution (LTE) or 5th-generation (5G) or short-range wireless data communication such as Bluetooth or WiFi. To transmit the environment configuration information of the vehicle configured by the mobile device to the electronic device of the vehicle, configuration of a communication channel between the mobile device and the electronic device of the vehicle is required. When mobile networks such as LTE, 5G, etc., are used, the same communication function needs to be supported not only by the user's mobile device, but also in the electronic device of the vehicle, increasing the cost of the vehicle due to the addition of network components to support the mobile networks. Moreover, data communication using a mobile network, such as LTE or 5G may incur additional fees generated by the mobile network operator.

On the other hand, when data communication is performed between the mobile device and the vehicle by using short-range wireless data communication such as Bluetooth or WiFi, data may be transmitted and received without using additional mobile network components such as a base station. However, cumbersome processes such as searching, pairing, and data transmission/reception between the mobile device and a Bluetooth or WiFi communication module of the vehicle are required.

SUMMARY

One or more embodiments of the instant disclosure provide an electronic device of a vehicle which uses short-range wireless data communication such as Bluetooth or WiFi instead of mobile networks to obtain environment configuration information of a vehicle from a mobile device, obtains environment configuration information of the vehicle configured by a user input by using a wireless data communication identifier (ID) (e.g., a Bluetooth ID or a Wireless Fidelity (WiFi) device name) of the mobile device, and controls configuration of an internal system of the vehicle by using the obtained environment configuration information, and an operating method of the electronic device.

Additional aspects will be set forth in part in the description which follows and, in part, will be apparent from the description, or may be learned by practice of the presented embodiments of the disclosure.

According to an embodiment of the disclosure, a method, performed by an electronic device mounted on a vehicle, of controlling an internal system of the vehicle includes identifying a wireless data communication identifier (ID) of a mobile device, obtaining environment configuration information of the vehicle based on a correlation between the identified wireless data communication ID and the environment configuration information of the vehicle, and controlling a configuration of the internal system of the vehicle by using the obtained environment configuration information.

For example, the wireless data communication ID may include a Bluetooth ID and/or WiFi name of the mobile device.

For example, the wireless data communication ID may be generated, using an application executed by the mobile device, by converting the environment configuration information of the vehicle set by a user input, and the application may include instructions for converting the environment configuration information of the vehicle into the wireless data communication ID based on a preset rule.

For example, the environment configuration information may include configuration parameter values for an internal temperature setting of the vehicle, a navigation setting, driver and passenger seat settings, a multimedia operation setting, an internal lighting setting of the vehicle, a CID setting, and/or a dashboard setting.

For example, the method may further include detecting turning-on of the vehicle; and searching for a previously registered mobile device in a registered-device list stored in a memory, based on a medium access control (MAC) address of the mobile device.

For example, when one mobile device is found as a result of the searching, the identified wireless data communication ID may be a wireless data communication ID of the found one mobile device.

For example, the method may further include determining a mobile device of a driver from among a plurality of mobile devices are found as a result of the searching, and the identified wireless data communication ID may be a wireless data communication ID of the determined mobile device of the driver.

For example, the determining of the mobile device of the driver may include displaying a pop-up menu for selecting the mobile device of the driver on a CID or outputting a voice message through a speaker and selecting the mobile device of the driver from among the plurality of mobile devices, based on a user input responding to the pop-up menu or the voice message.

For example, the method may further include performing pairing with the mobile device by using a wireless communication module, receiving a configuration value of changed environment configuration information from the paired mobile device, by using the wireless communication module, and changing the configuration of the internal system of the vehicle, based on the received configuration value.

For example, the method may further include detecting turning-off of the vehicle and transmitting configuration value information of the internal system of the vehicle to the mobile device by using a wireless communication module, when the vehicle is turned off.

According to another embodiment of the disclosure, an electronic device includes a wireless communication module including a Bluetooth transmission/reception module and/or a Wireless Fidelity (WiFi) module and configured to wirelessly perform data communication with a mobile device, a memory storing a program including one or more instructions for controlling the electronic device, and a processor configured to execute the one or more instructions of the program stored in the memory, in which the processor is further configured to identify a wireless data communication identifier (ID) of the mobile device, obtain environment configuration information of the vehicle based on a correlation between the identified wireless data communication ID and the environment configuration information of the vehicle, and control a configuration of an internal system of the vehicle by using the obtained environment configuration information.

For example, the wireless data communication ID may be generated, using an application executed by the mobile device, by converting the environment configuration information of the vehicle set by a user input, and the application may include instructions for converting the environment configuration information of the vehicle into the wireless data communication ID based on a preset rule.

For example, the environment configuration information may include configuration parameter values for an internal temperature setting of the vehicle, a navigation setting, driver and passenger seat settings, a multimedia operation setting, an internal lighting setting of the vehicle, a CID setting, and/or a dashboard setting.

For example, the electronic device may further include a database storing device identification information and a medium access control (MAC) address of at least one mobile device, and the processor may be further configured to detect turning-on of the vehicle, obtain a MAC address of the mobile device from the wireless communication module, and search for the mobile device in the database based on the obtained MAC address.

For example, when one mobile device is found as a result of the searching, the identified wireless data communication ID may be a wireless data communication ID of the found one mobile device For example, the processor may be further configured to determine a mobile device of a driver from among a plurality of mobile devices when the plurality of mobile devices are found as a result of the searching, and the identified wireless data communication ID may be a wireless data communication ID of the determined mobile device of the driver.

For example, the electronic device may further include a display and a user input interface, in which the processor may be further configured to display a graphical user interface (GUI) for selecting the mobile device of the driver on the display and select the mobile device of the driver from among the plurality of mobile devices, based on a user input received through the user input interface in response to displaying the GUI.

For example, the processor may be further configured to perform pairing with the mobile device by using the wireless communication module, receive a configuration value of changed environment configuration information from the paired mobile device, by using the wireless communication module, and change the configuration of the internal system of the vehicle, based on the received configuration value.

For example, the processor may be further configured to detect turning-off of the vehicle, and control the wireless communication module to transmit configuration value information of the internal system of the vehicle to the mobile device when the vehicle is turned off.

According to another embodiment of the disclosure, a computer-readable recording medium may have recorded thereon a program to be executed on a computer.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a flowchart showing an operating method of an electronic device, according to an embodiment of the disclosure;

FIG. 9 is a flowchart showing operations of an electronic device and a mobile device, according to an embodiment of the disclosure.

DETAILED DESCRIPTION

Although terms used in embodiments of the specification are selected from among general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the specification should be defined not by the simple names of the terms but by the meaning of the terms and the contents throughout the disclosure.

It is to be understood that a singular form of a noun corresponding to an item may include one or more of the things, unless the relevant context clearly indicates otherwise. All of the terms used herein including technical or scientific terms have the same meanings as those generally understood by those of ordinary skill in a technical field described in the specification.

Throughout the entirety of the disclosure, if it is assumed that a certain part includes a certain component, the term 'including' means that a corresponding component may further include other components unless a specific meaning opposed to the corresponding component is written. The term used in the specification such as "unit" or "module" indicates a unit for processing at least one function or operation, and may be implemented in hardware, software, or in a combination of hardware and software.

Throughout the disclosure, the expression "at least one of a, b or c" indicates only a, only b, only c, both a and b, both a and c, both b and c, all of a, b, and c, or variations thereof.

An expression "configured (or set) to" used in the specification may be replaced with, for example, "suitable for," "having the capacity to," "designed to," "adapted to," "made to," or "capable of" according to a situation. The term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that may perform a corresponding operation by executing at least one software program stored in a memory.

Figure 1:
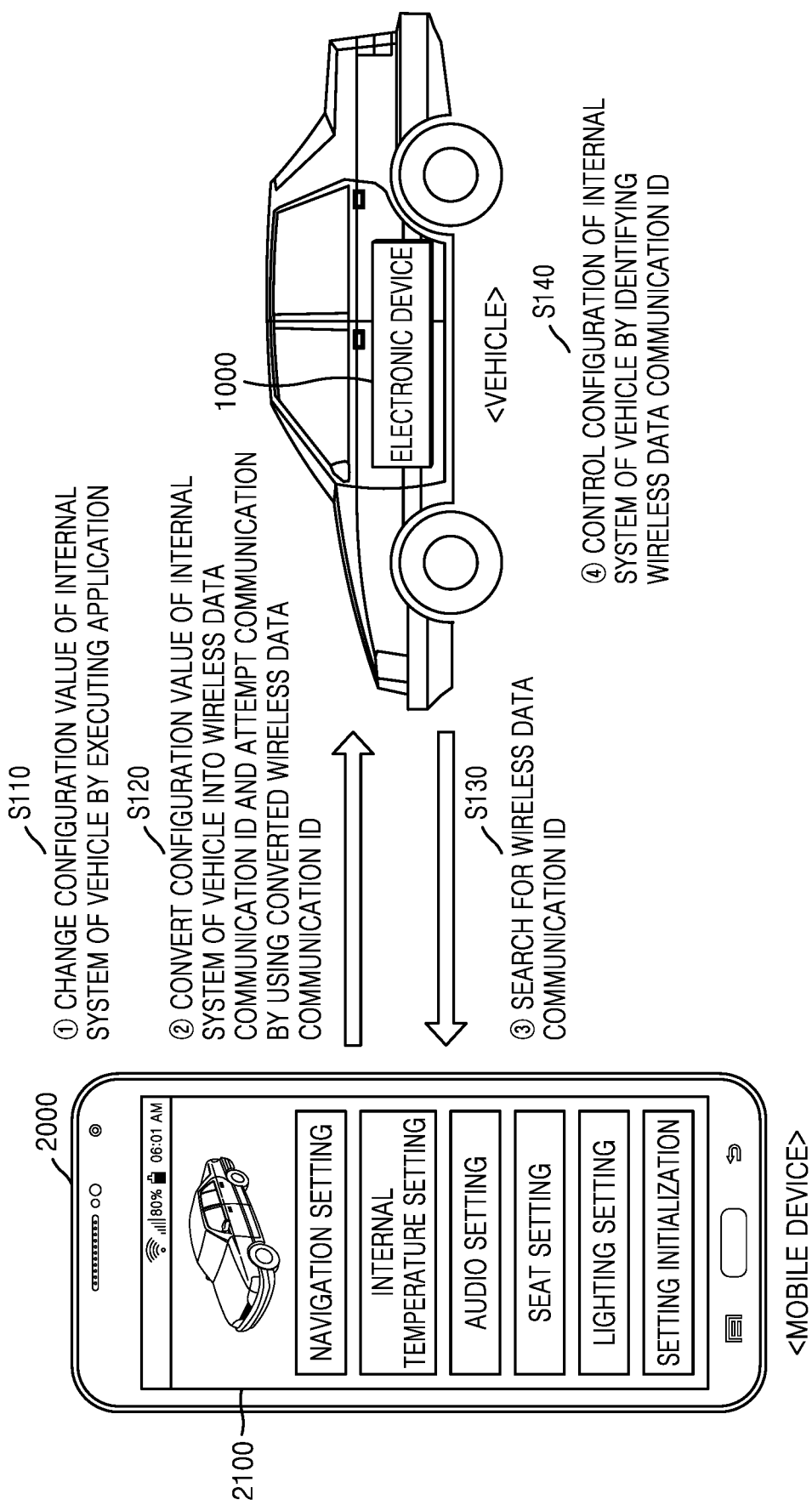
FIG. 1 is a conceptual view showing operations of an electronic device and a mobile device, according to an embodiment of the disclosure.

FIG. 1 is a conceptual view showing operations of an electronic device 1000 and a mobile device 2000 according an embodiment of to the disclosure.

Referring to FIG. 1, the electronic device 1000 may be mounted in a vehicle. The electronic device 1000 may perform data communication with the mobile device 2000 and control the configuration of an internal system of a vehicle.

The mobile device 2000 may display a graphical user interface (GUI) on a display unit 2100 by executing an application, and perform specific operations based on a user input received through the GUI. The mobile device 2000 may be, for example, but not limited to, a smart phone or a tablet personal computer (PC). The mobile device 2000 may be any one of mobile computing devices including, for example, a PC, a laptop, a personal digital assistant (PDA), a media player, an electronic-book terminal, a digital broadcasting terminal, an MP3 player, a digital camera, and a home appliance.

In the embodiment shown in FIG. 1, the mobile device 2000 may change a configuration value of the internal system of the vehicle by executing an application in operation S110. In an embodiment of the disclosure, the mobile device 2000 may display a GUI for setting a configuration parameter value of the internal system of the vehicle on a display unit 2100. The mobile device 2000 may set the configuration parameter value of the internal system of the vehicle or change a preset parameter value, based on the received user input.

The configuration parameter of the internal system of the vehicle may include at least one of, for example, an internal temperature setting of the vehicle, a navigation setting, drive and passenger seat settings, a multimedia operation setting, an internal lighting setting of the vehicle, a central information display (CID) setting, or a dashboard setting.

The mobile device 2000 may convert the configuration value of the internal system of the vehicle into a wireless data communication identifier (ID) and attempt data communication with the vehicle by using the wireless data communication ID, in operation S120. In an embodiment of the disclosure, the mobile device 2000 may convert environment configuration information that contains the configuration value set by the user input into the wireless data communication ID by using an application. In an embodiment of the disclosure, the application may include instructions for converting the environment configuration information of the vehicle into the wireless data communication ID based on a preset rule or algorithm. In an embodiment of the disclosure, the application may convert the environment configuration information of the vehicle, which was configured by the user, into a Bluetooth ID or a WiFi device name. The mobile device 2000 may attempt data communication connection with the electronic device 1000 mounted on the vehicle by using the wireless data communication ID.

The electronic device 1000 may search for the wireless data communication ID of the mobile device 2000 in operation S130. In an embodiment of the disclosure, identification information and media access control (MAC) address of the mobile device 2000, registered for connection with the electronic device 1000, may be stored in a registered-device database (DB) 1600 (see FIG. 2). When the user of the mobile device 2000 gets in the vehicle, the electronic device 1000 may search for the wireless data communication ID of the mobile device 2000 in the registered-device database 1600 for wireless communication connection. In an embodiment of the disclosure, the electronic device 1000 may search for the wireless data communication ID of the mobile device 2000 periodically at preset time periods.

The electronic device 1000 may control the configuration of the internal system of the vehicle by identifying the wireless data communication ID, in operation S140. In an embodiment of the disclosure, the electronic device 1000 may interpret the searched wireless data communication ID of the mobile device 2000 based on correlation between the wireless data communication ID and the environment configuration information of the vehicle and obtain environment configuration information containing a configuration value of the internal system of the vehicle from the wireless data communication ID as a result of the interpretation. The electronic device 1000 may control the configuration of the internal system of the vehicle by using the obtained environment configuration information.

For example, by interpreting a Bluetooth ID of the mobile device 2000, the electronic device 1000 may control the air-conditioning system to set an internal temperature of the vehicle to about 24, control the driver's seat to have an angle of 100 degrees, and control the multimedia device to play back music. In this case, the electronic device 1000 may obtain the environment configuration information of the vehicle, configured by the mobile device 2000, by identifying the Bluetooth ID without performing Bluetooth pairing with the mobile device 2000, and control the configuration of the internal system of the vehicle based on the environment configuration information.

Conventionally, the environment of the internal system of the vehicle may be configured through an application program of the mobile device 2000, and the configured environment configuration information may be transmitted using Long Term Evolution (LTE) or $5^{th}$-generation (5G) network provided by the mobile network operator, such that the user has to pay a usage fee to the communication operator. When networks such as LTE or 5G are used, the electronic device 1000 mounted in the vehicle as well as the user's mobile device 2000 needs to include a communication module that supports the same communication function, increasing the cost of the vehicle due to addition of network components. Conversely, a vehicle that does not support networks such as LTE or 5G would not be operable with the mobile device. On the other hand, conventionally, when data communication is performed between the mobile device 2000 and the electronic device 1000 by using short-range wireless data communication such as Bluetooth or WiFi, cumbersome processes such as searching and pairing between the mobile device 2000 and the Bluetooth or WiFi communication module inside the vehicle are required.

The electronic device 1000 according to an embodiment of the disclosure may use short-range wireless data communication methods such as Bluetooth or WiFi, obtain the environment configuration information of the vehicle by identifying the wireless data communication ID of the mobile device 2000, and control the internal system of the vehicle based on the obtained environment configuration information of the vehicle, thus omitting at least the pairing step. Thus, the electronic device 1000 according to the disclosure may improve user convenience. Moreover, because mobile networks such as LTE are not used, the corresponding communication modules for the mobile networks do not need to be mounted on the vehicle, avoiding additional costs for manufacturing the vehicle. Furthermore, the mobile device may be backwards compatible with older vehicles that only have Bluetooth or WiFi capabilities.

Figure 2:
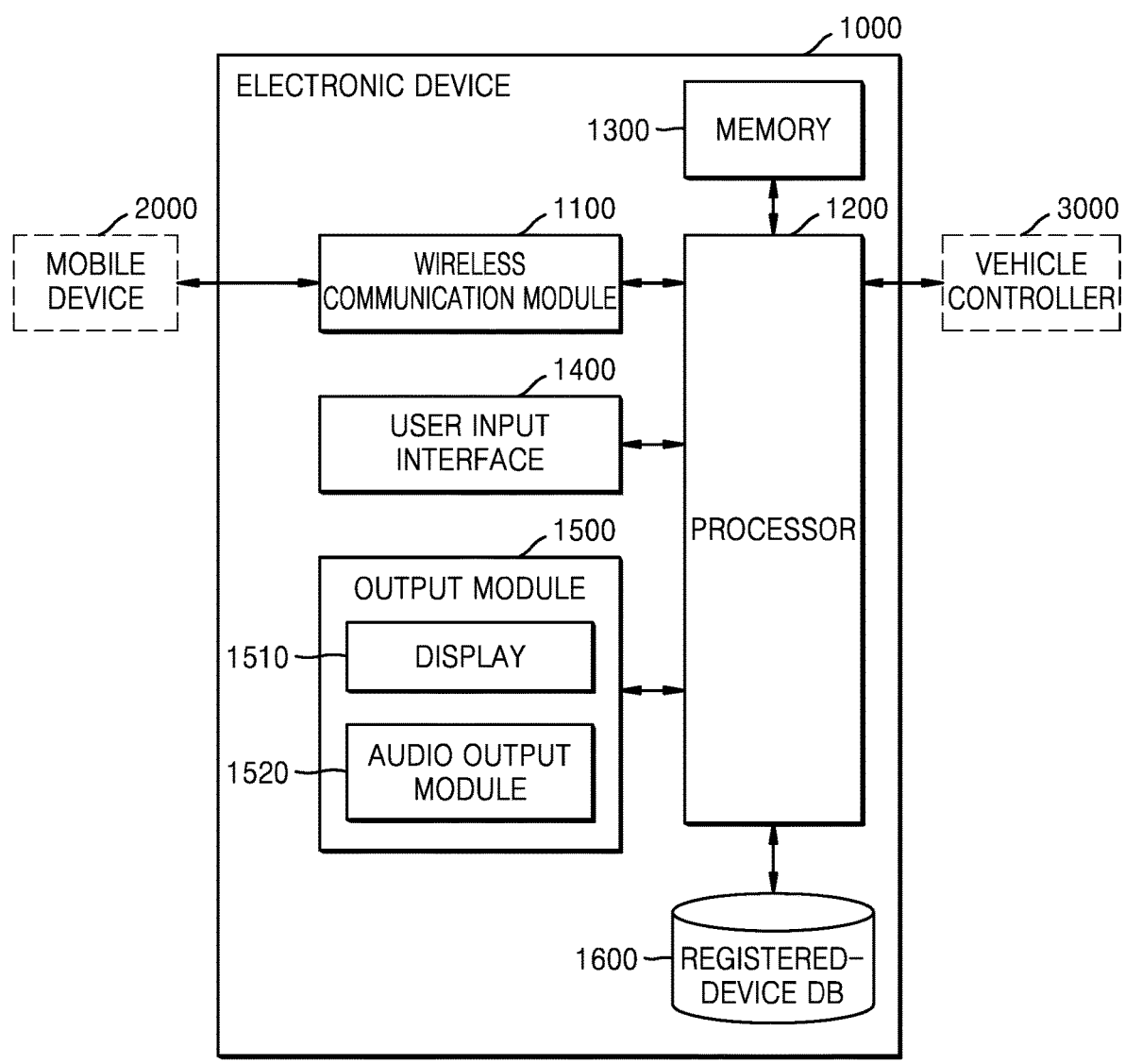
FIG. 2 is a block diagram of an electronic device according to an embodiment of the disclosure.

FIG. 2 is a block diagram of an electronic device according to an embodiment of the disclosure. In an embodiment of the disclosure, the electronic device 1000 may be a device mounted on the vehicle to control the internal system of the vehicle. The electronic device 1000 may be connected with the mobile device 2000 through wireless data communication and control the internal system of the vehicle through the vehicle controller 3000.

Referring to FIG. 2, the electronic device 1000 may include a wireless communication module 1100, a processor 1200, a memory 1300, a user input module 1400, an output module 1500, and a registered-device database 1600. The wireless communication module 1100, the processor 1200, the memory 1300, the user input interface 1400, the output module 1500, and the registered-device database 1600 may be electrically and/or physically connected with one another. Components shown in FIG. 2 merely correspond to one possible embodiment of the disclosure, and the electronic device 1000 are not limited to the one shown in FIG. 2. That is, the electronic device 1000 may not include some of the components shown in FIG. 2, or may further include components not shown in FIG. 2.

The wireless communication module 1100 may perform wireless data communication with the mobile device 2000 under control of the processor 1200. The wireless communication module 1100 may implement Bluetooth, Bluetooth Low Energy (BLE), and/or WiFi. However, the disclosure is not limited thereto, and the wireless communication module 1100 may include a communication module that implements other protocols such as wireless local area network (LAN) communication, WiFi Direct (WFD), Infrared Data Association (IrDA), near field communication (NFC), Wireless Broadband (Wibro) Internet, World Interoperability for Microwave Access (WiMAX), Wireless Gigabit Alliance (WiGig), and/or radio frequency (RF) communication. The wireless communication module 1100 may identify the wireless data communication ID of the mobile device 2000 and provide the identified wireless data communication ID to the processor 1200. In an embodiment of the disclosure, the wireless communication module 1100 may be paired with the mobile device 2000 and wirelessly perform data transmission/reception with the mobile device 2000, under control of the processor 1200.

The processor 1200 may execute one or more instructions stored in the memory 1300. The processor 1200 may include hardware components that perform arithmetic, logic, and input/output operations and signal processing. The processor 1200 may include at least one of a central processing unit (CPU), a microprocessor, a graphic processing unit (GPU), application specific integrated circuits (ASICs), digital signal processors (DSPs), digital signal processing devices (DSPDs), programmable logic devices (PLDs), or field programmable gate arrays (FPGAs), without being limited thereto. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 1300 may include non-volatile memory such as flash memory, a hard disk, a multimedia card, another type of memory card (e.g., secure digital (SD) memory, extreme digital (XD) memory, etc.), read-only memory (ROM), electrically erasable programmable read-only memory (EEPROM), and/or programmable read-only memory (PROM). The memory 1300 may also include volatile memory such as random-access memory (RAM) or static random-access memory (SRAM).

The memory 1300 may store instructions, data structure or program codes which are readable and executable by the processor 1200. In the following embodiment of the disclosure, the processor 1200 may be implemented by executing instructions or codes of a program stored in the memory 1300. For example, the memory 1300 may store data regarding a correlation between the wireless data communication ID of the mobile device 2000 and the environment configuration information of the vehicle, and program instruction codes for controlling the configuration of the internal system of the vehicle by using the environment configuration information.

The processor 1200 may identify the wireless data communication ID of the mobile device 2000 by using the wireless communication module 1100. The wireless data communication ID of the mobile device 2000 may be, for example, Bluetooth ID or a WiFi device name. In an embodiment of the disclosure, when the wireless data communication ID is a Bluetooth ID, the wireless communication module 1100 may wait for Bluetooth connection with the mobile device 2000 until the Bluetooth ID of the mobile device 2000 is identified. The wireless communication module 1100 may provide the identified Bluetooth ID to the processor 1200 when the Bluetooth ID of the mobile device 2000 is identified.

The wireless data communication ID may be generated through conversion of the environment configuration information of the vehicle, configured by the user input, by execution of the application by the mobile device 2000. A detailed embodiment where the mobile device 2000 generates the wireless data communication ID by using the application will be described in detail with reference to FIGS. 5, 6A, 6B, 6C, 7A, 7B, and 7C.

The processor 1200 may obtain the environment configuration information of the vehicle based on a correlation between the identified wireless data communication ID and the environment configuration information of the vehicle. In an embodiment of the disclosure, the wireless data communication ID and the environment configuration information of the vehicle may be correlated based on rules preset by the mobile device 2000. Data regarding the correlation may be stored in the memory 1300. For example, the correlation between the wireless data communication ID and the environment configuration information of the vehicle may be stored in the form of a lookup table (LUT) in the memory 1300. The processor 1200 may interpret the wireless data communication ID identified from the mobile device 2000 based on the correlation between the wireless data communication ID and the environment configuration information of the vehicle by referring to the LUT stored in the memory 1300, and obtain the environment configuration information of the vehicle as a result of the interpretation. A detailed embodiment where the processor 1200 obtains the environment configuration information of the vehicle from the identified wireless data communication ID will be described in detail with reference to FIGS. 7A, 7B, and 7C.

The processor 1200 may control the configuration of the internal system of the vehicle by using the obtained environment configuration information. The environment configuration information may include at least one configuration parameter of the internal system of the vehicle. The environment configuration information may include configuration value information regarding at least one of, for example, internal temperature setting of the vehicle, navigation setting, driver and passenger seat setting, multimedia operation setting, internal lighting setting of the vehicle, central information display (CID) setting, or dashboard setting. The processor 1200 may provide the configuration value information corresponding to the internal system of the vehicle out of the environment configuration information to the vehicle controller 3000 and control the internal system of the vehicle through the vehicle controller 3000. For example, by interpreting the identified Bluetooth ID of the mobile device 2000 and using environment configuration information obtained as the result of the interpretation, the processor 1200 may control the air-conditioning system to set an internal temperature of the vehicle to about 24, control the driver's seat to have an angle of 100 degrees, and control the multimedia device to play back music. A detailed structure of the vehicle controller 3000 will be described in detail with reference to FIG. 3.

In an embodiment of the disclosure, the processor 1200 may detect turning-on of the vehicle and do a search in the registered-device database 1600 to determine whether the mobile device 2000 is a registered device. In an embodiment of the disclosure, the processor 1200 may obtain the MAC address of the mobile device 2000 from the wireless communication module 1100 and search for the obtained MAC address of the mobile device 2000 in the registered-device database 1600. The registered-device database 1600 may be a database that stores device identification information and MAC addresses of the previously registered mobile devices 2000. In the embodiment of the disclosure shown in FIG. 2, the registered-device database 1600 is shown as a component included in the electronic device 1000, but the instant disclosure is not so limited. In another embodiment of the disclosure, the registered-device database 1600 may be an external database that is separate from the electronic device 1000. In another embodiment of the disclosure, the registered-device database 1600 may be included in the memory 1300.

When the single mobile device 2000 is found as a result of the search, the processor 1200 may identify the wireless data communication ID of the found mobile device 2000. When a plurality of mobile devices are found as a result of the search, the processor 1200 may determine that a particular device in the plurality of device is the driver's mobile device and identify the wireless data communication ID of the driver's mobile device.

The processor 1200 may receive a user input to select the mobile device of the driver from among the plurality of found mobile devices. In an embodiment of the disclosure, the processor 1200 may display a list of the plurality of found mobile devices on a display 1510, and display a GUI for selecting the mobile device of the driver from the list. In another embodiment of the disclosure, the processor 1200 may output a voice message for selecting the mobile device of the driver from among the plurality of found mobile devices through a sound output module 1520. The processor 1200 may select the mobile device of the driver from among the plurality of mobile devices based on the user input received through the user input interface 1400. An embodiment of the disclosure where the processor 1200 searches for the mobile device 2000 in the registered-device database 1600 and identifies the wireless data communication ID of the found mobile device 2000 will be described in detail with reference to FIG. 8.

In an embodiment of the disclosure, the processor 1200 may perform pairing with the mobile device 2000 by using the wireless communication module 1100 and receive the changed configuration value of the environment configuration information from the paired mobile device 2000. The processor 1200 may change the configuration value of the internal system of the vehicle based on the received configuration value. The processor 1200 may perform pairing with the mobile device 2000 after start of driving of the vehicle. A detailed embodiment of the disclosure after driving will be described in detail with reference to FIG. 9.

In an embodiment of the disclosure, the processor 1200 may detect turning-off of the vehicle and transmit configuration value information of the internal system of the vehicle to the mobile device 2000 by using the wireless communication module 1100. A detailed embodiment of the disclosure where the processor 1200 transmits final configuration value information of the internal system of the vehicle to the mobile device 2000 after turning-off of the vehicle will be described in detail with reference to FIG. 10.

The user input interface 1400 may include, but not limited to, hardware such as a button, a jog dial, a trackball, a touch pad, a key pad, a switch, etc. The user input interface 1400 may include a microphone capable of receiving a voice input such as user's utterance, a voice command, etc. In an embodiment of the disclosure, the user input interface 1400 may include a touchscreen that receives a touch input and displays a GUI. When the plurality of mobile devices are found, the user input interface 1400 may receive a user input to select the mobile device of the driver.

The output module 1500 may include the display 1510 and the sound output module 1520. The display 1510 may include, but not limited to, a hardware device including at least one of for example, a cathode ray tube (CRT) display, a liquid crystal display (LCD) display, a plasma display panel (PDP) display, an organic light emitting diode (OLED) display, a field emission display (FED) display, a light emitting diode (LED) display, a vacuum fluorescence display (VFD) display, a digital light processing (DLP) display, a flat panel display (FPD) display, a three-dimensional (3D) display, or a transparent display. In an embodiment of the disclosure, the display 1510 may include a touchscreen including a touch interface. When the display 1510 includes a touchscreen, the display 1510 may be a component integrated with the user input interface 400 including a touch panel. Under control of the processor 1200, the display 1510 may display a list of a plurality of mobile devices found in the registered-device database 1600 and a GUI for selecting the mobile device of the driver from the list. For example, the display 1510 may display a pop-up menu for selecting any one mobile device from the list of the plurality of mobile devices under control of the processor 1200.

The sound output module 1520 may output audio data. The sound output module 1520 may include, for example, a speaker, a buzzer, or the like. In an embodiment of the disclosure, the sound output module 1520 may output a voice message for selecting the mobile device of the driver from among the plurality of mobile devices, under control of the processor 1200.

Figure 3:
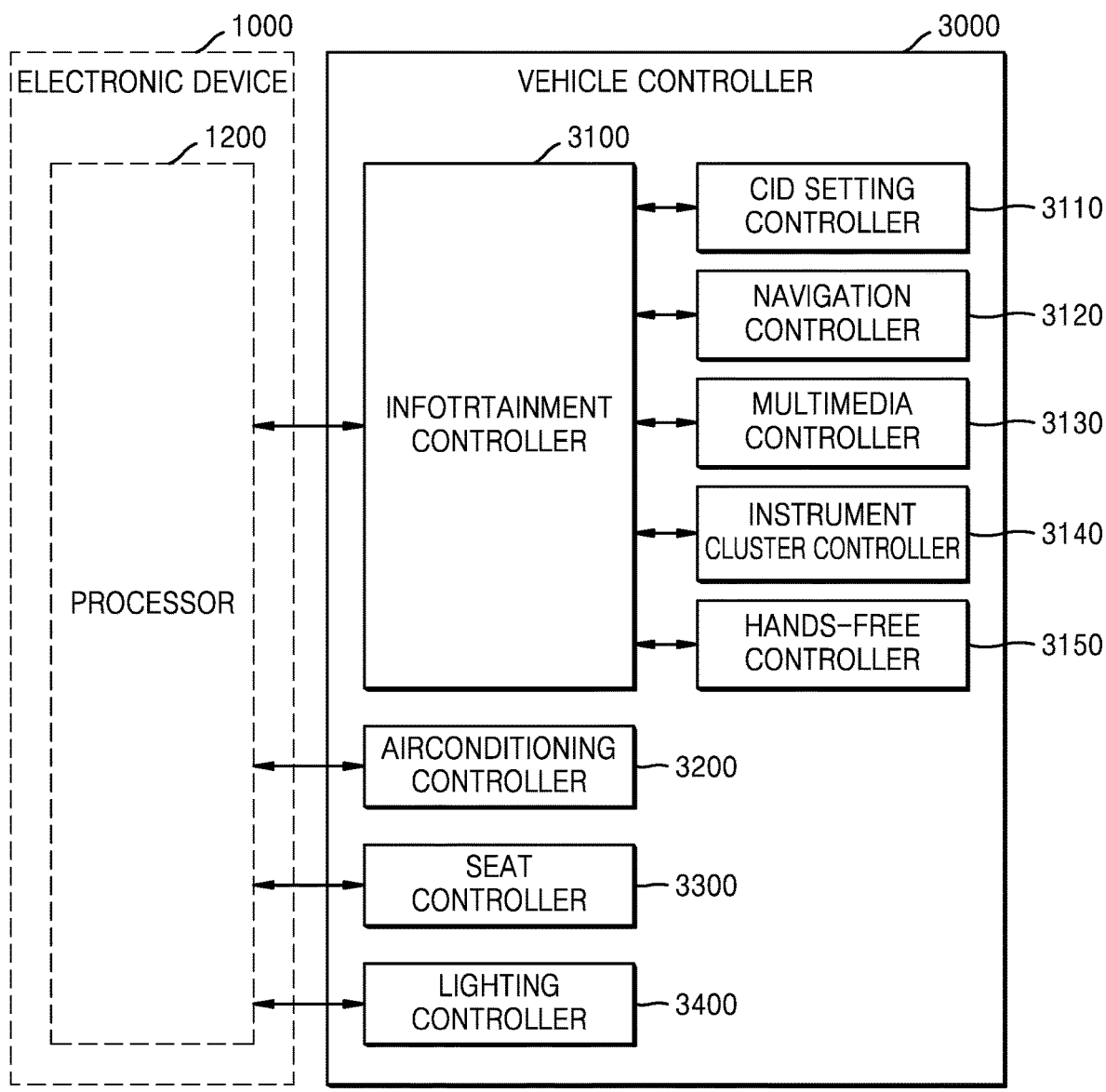
FIG. 3 is a block diagram showing a structure of a vehicle controller according to an embodiment of the disclosure.

FIG. 3 is a block diagram showing a structure of the vehicle controller 3000 according to an embodiment of the disclosure. The vehicle controller 3000 may obtain environment configuration information from the processor 1200 of the electronic device 1000 and control a configuration of the internal system of the vehicle by using configuration value information that corresponds to various environmental controllers.

Referring to FIG. 3, the vehicle controller 3000 may include an infotainment controller 3100, an air-conditioning controller 3200, a seat controller 3300, and a lighting controller 3400.

The infotainment controller 3100 may control the configuration of the internal system of the vehicle that provides information to the user, based on the environment configuration information obtained from the processor 1200 of the electronic device 1000. Here, 'infotainment' is a portmanteau word of information and entertainment. The infotainment controller 3100 may include a central information display (CID) setting controller 3110, a navigation controller 3120, a multimedia controller 3130, an instrument cluster controller 3140, and a hands-free controller 3150.

The CID setting controller 3110 may control a display setting of a CID inside the vehicle. For example, the CID setting controller 3110 may control a setting regarding display of information such as navigation information, vehicle state information, weather information, external temperature information, etc., displayed on the CID.

The navigation controller 3120 may control a vehicle location calculation function, where the location of the vehicle is calculated by using a global positioning system (GPS) satellite or an autonomous navigation sensor, a route search function of searching for an optimal route to a destination, a guidance function of guiding a found route, etc. In an embodiment of the disclosure, the navigation controller 3120 may store an identification value (e.g., an identification number of a favorites list) regarding frequently visiting destinations such as home, office, school, etc., and location information of the frequently visiting destinations, obtain the identification value of a particular frequently visiting destination from the electronic device 1000, determine the destination based on the obtained identification value, and control navigation to that destination.

The multimedia controller 3130 may control various settings related to playing of audio data or video data recorded in a CD, a DVD, a Blu-ray disk, a USB memory, etc., or streamed from the mobile device 2000 connected through wireless data communication such as Bluetooth, and playing of digital broadcasting, radio broadcasting, etc. The multimedia controller 3130 may control various settings related to playing of music and/or digital broadcasting based on the environment configuration information obtained from the electronic device 1000. For example, the multimedia controller 3130 may adjust at least one of volume, sound field, equalizer (EQ) setting (e.g., emphasis of low notes, mid-range notes, and high notes), presetting of a preferred broadcasting station, display brightness, or color sense.

The instrument cluster controller 3140 may control settings regarding the display of the dashboard inside the vehicle. The instrument cluster controller 3140 may control settings regarding the display of information displayed on the dashboard, e.g., speedometer, revolution per minute (RPM) gauge, accumulated driving distance information, refueling quantity information, various failures and defects, etc., based on the environment configuration information obtained from the electronic device 1000. In an embodiment of the disclosure, when the dashboard of the vehicle includes an LCD or an OLED display, the instrument cluster controller 3140 may display a GUI on the dashboard and control the settings regarding display of the GUI.

The hands-free controller 3150 may control configurations value such as volume, phone numbers, etc., of Bluetooth hands-free functions based on the environment configuration information received from the electronic device 1000.

The air-conditioning controller 3200 may control the temperature and wind strength of the air conditioner, the temperature of the heater, etc., based on the environment configuration information received from the electronic device 1000.

The seat controller 3300 may control settings regarding at least one of positions, angles of backs of the seats, temperatures of heated seats, or wind strengths of seat ventilation for the driver seat and the front passenger seat, based on the environment configuration information received from the electronic device 1000. In an embodiment of the disclosure, the seat controller 3300 may control settings regarding at least one of positions, angles of backs of the seats, temperatures of heated seat, or wind strengths of seat ventilation for the rear passenger seats as well as the driver seat and the front passenger seat.

The lighting controller 3400 may control settings of lightings including head lamps outside the vehicle, rear combination lamps, fog lamps, etc., and indoor lighting inside the vehicle, etc., based on the environment configuration information received from the electronic device 1000.

Figure 4:
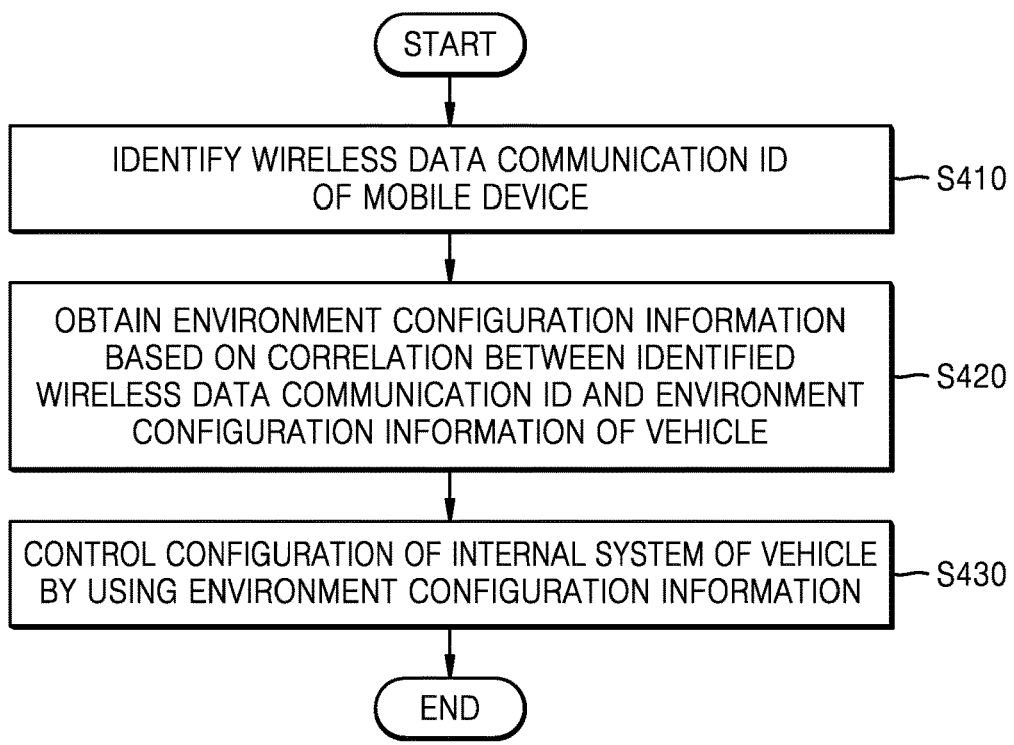
FIG. 4 is a flowchart showing an operating method of an electronic device, according to an embodiment of the disclosure.

FIG. 4 is a flowchart showing an operating method of the electronic device 1000 according to an embodiment of the disclosure.

In operation S410, the electronic device 1000 may identify a wireless data communication ID of the mobile device 2000. For example, the wireless data communication ID may be a Bluetooth ID or a WiFi device name of the mobile device 2000. In an embodiment of the disclosure, the wireless data communication ID may be converted from environment configuration information of the vehicle configured by the user input, and the conversion may be performed by the application executing on the mobile device 2000.

When the wireless data communication ID is a Bluetooth ID, the electronic device 1000 may wait for Bluetooth connection with the mobile device 2000 until the Bluetooth ID of the mobile device 2000 is identified. The electronic device 1000 may identify the Bluetooth ID of the mobile device 2000 by using the wireless communication module 1100 (see FIG. 2).

In operation S420, the electronic device 1000 may obtain the environment configuration information of the vehicle based on a correlation between the identified wireless data communication ID and the environment configuration information of the vehicle. In an embodiment of the disclosure, the wireless data communication ID and the environment configuration information of the vehicle may be correlated based on a rule preset by the mobile device 2000. Data regarding the correlation may be stored in the memory 1300 (see FIG. 2) of the electronic device 1000. The electronic device 1000 may interpret the wireless data communication ID of the mobile device 2000 by referring to information regarding the correlation stored in the memory 1300 and obtain the environment configuration information of the vehicle as a result of the interpretation. The environment configuration information may include configuration value information regarding at least one of, for example, an internal temperature setting of the vehicle, a navigation setting, driver and passenger seat settings, a multimedia operation setting, an internal lighting setting of the vehicle, a CID setting, or a dashboard setting.

In operation S430, the electronic device 1000 may control the configuration of the internal system of the vehicle, by using the environment configuration information. In an embodiment of the disclosure, the electronic device 1000 may control the internal system of the vehicle by using the configuration value information in the environment configuration information for the corresponding internal system of the vehicle. For example, by interpreting the identified Bluetooth ID of the mobile device 2000 and using environment configuration information obtained as a result of the interpretation, the electronic device 1000 may control the air-conditioning system to set an internal temperature of the vehicle to about 24☐, control the driver's seat to have an angle of 100 degrees, and control the multimedia device to play back music.

Figure 5:
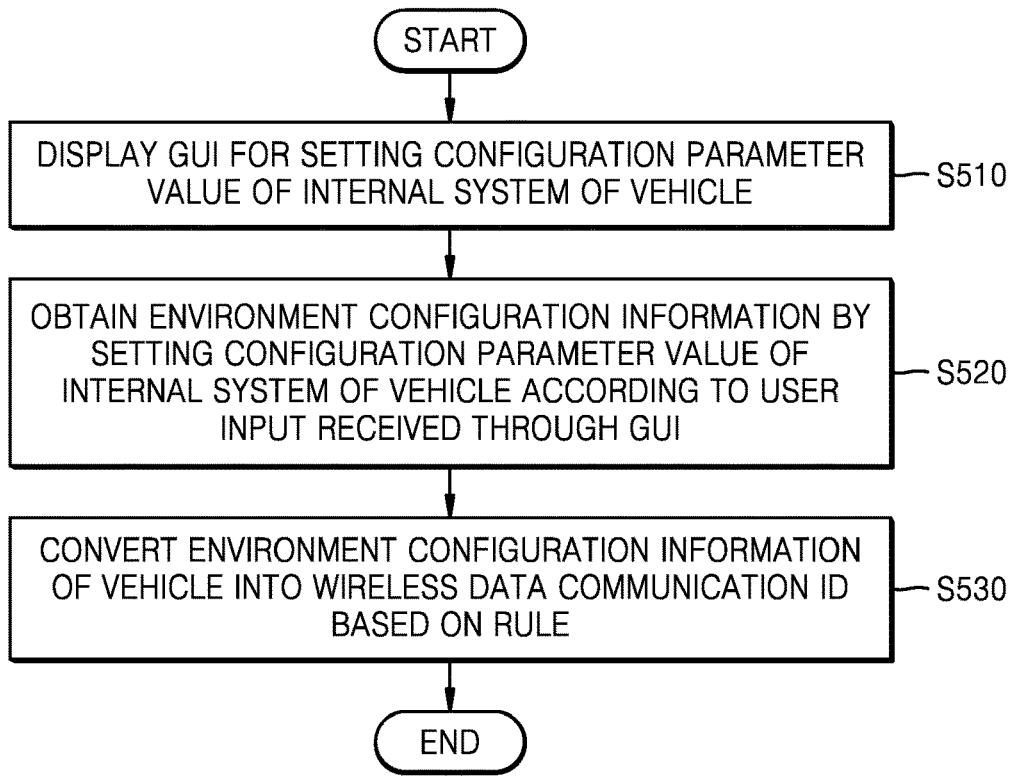
FIG. 5 is a flowchart showing an embodiment in which a mobile device according to an embodiment of the disclosure generates a wireless data communication identifier (ID) by executing an application.

FIG. 5 is a flowchart showing an embodiment in which the mobile device 2000 according to the disclosure generates a wireless data communication ID by executing an application.

In operation S510, the mobile device 2000 may display a GUI for setting a configuration parameter of the internal system of the vehicle. In an embodiment of the disclosure, the mobile device 2000 may execute the application and display a GUI for receiving a user input to set a configuration parameter value of the internal system of the vehicle on the display module 2100 (see FIGS. 6A through 6C. The mobile device 2000 may display a GUI related to at least one of configuration parameters including destination and/or route setting of navigation, setting of the internal temperature of the vehicle, audio play environment setting (e.g., volume, sound field, EQ, etc.), positions and angles of the driver seat and/or the passenger seat, or lighting settings, and receive a configuration value regarding a configuration parameter from the user.

In operation S520, the mobile device 2000 may obtain the environment configuration information of the vehicle by setting the configuration parameter value of the internal system of the vehicle according to the user input received through the GUI. In an embodiment of the disclosure, the mobile device 2000 may obtain the environment configuration information of the vehicle by combining the configuration parameter value set by the user input using the application.

In operation S530, the mobile device 2000 may convert the environment configuration information of the vehicle into the wireless data communication ID, based on a rule. In an embodiment of the disclosure, the mobile device 2000 may convert the environment configuration information of the vehicle into the wireless data communication ID, by executing the application. The wireless data communication ID may be a Bluetooth ID or a WiFi device name.

The application executed by the mobile device 2000 may be an application program including instructions or program code for converting the environment configuration information of the vehicle into the wireless data communication ID based on a preset rule. In an embodiment of the disclosure, the application may be executed by, but not limited to, the mobile device 2000. The application may be included and provided in a computer program product. The application may be traded as a product between a seller and a buyer.

In an embodiment of the disclosure, the application may be provided by a manufacturer of the vehicle or the electronic device 1000. In an embodiment of the disclosure, the application may include a product (e.g., a downloadable application) in the form of a software program electronically distributed by the manufacturer or the electronic device 1000 through an electronic market (e.g., Google Play Store or App Store). For the electronic distribution, at least a part of the application may be stored in a non-transitory storage medium or temporarily generated. In this case, the storage medium may be a server owned by the manufacturer of the electronic device 1000, the server of the electronic market, or a relay server that temporarily stores software programs.

A detailed embodiment of the disclosure where the mobile device 2000 converts the wireless data communication ID from the environment configuration information of the vehicle by executing the application will be described in detail with reference to FIGS. 7A, 7B, and 7C.

Figure 6A:
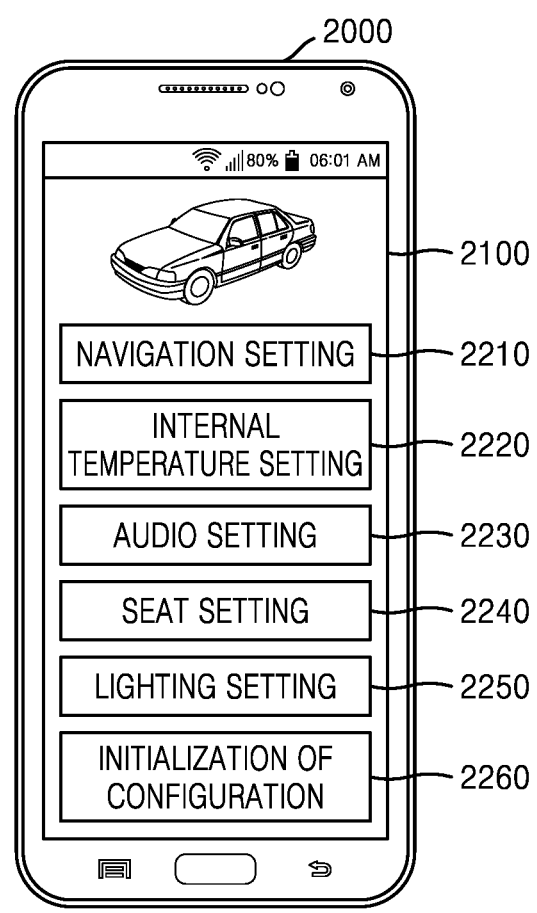
FIG. 6A shows an exemplary embodiment of a graphical user interface (GUI) for obtaining environment configuration information of a vehicle by execution of an application by a mobile device, according to an embodiment of the disclosure.

FIG. 6A shows an exemplary embodiment of a GUI for obtaining environment configuration information of a vehicle by execution of an application by the mobile device 2000 according to an embodiment of the disclosure.

Referring to FIG. 6A, the mobile device 2000 may display a GUI for setting a configuration parameter value of the internal system of the vehicle on the display module 2100. In an embodiment of the disclosure, on the display module 2100 of the mobile device 2000, there may be a first GUI 2210 for navigation setting of the vehicle, a second GUI 2220 for setting the internal temperature of the vehicle, a third GUI 2230 for setting audio playing environment, a fourth GUI 2240 for setting the driver seat and/or the passenger seats, a fifth GUI 2250 for setting lightings of the vehicle, and a sixth GUI 2260 for setting initialization. The embodiment of the disclosure shown in FIG. 6A is an example of a GUI used for the mobile device 2000 to receive an input for setting a configuration parameter value of the internal system of the vehicle from the user by executing an application, and the GUI according to the disclosure is not limited to that shown in FIG. 6A.

Figure 6B:
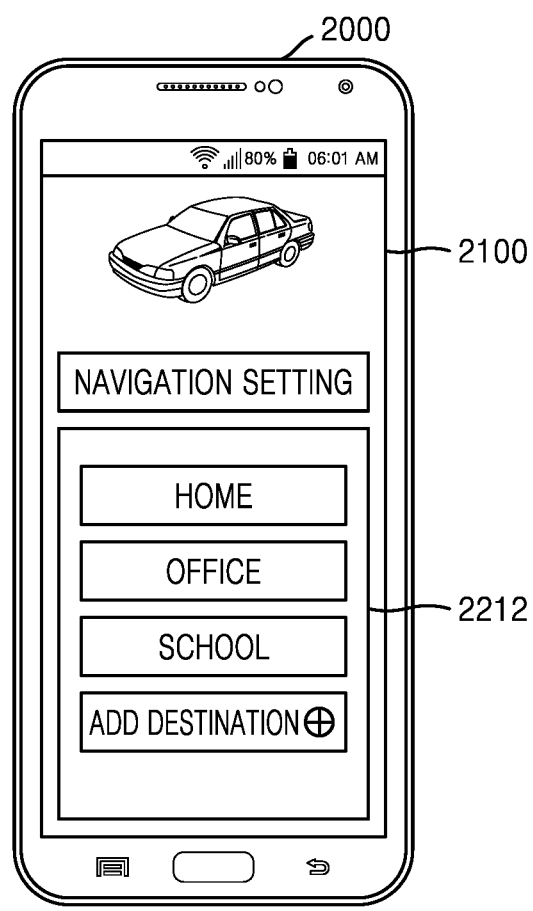
FIG. 6B shows an exemplary embodiment of a graphical user interface (GUI) for obtaining environment configuration information of a vehicle by execution of an application by a mobile device, according to an embodiment of the disclosure.

The first GUI 2210 may be a user interface for receiving a user input to set a destination or a route of the navigation system of the vehicle. FIG. 6B shows an exemplary embodiment of a GUI for obtaining environment configuration information of a vehicle by execution of an application by the mobile device 2000 according to an embodiment of the disclosure. Referring FIG. 6B, the first GUI 2210 may display a favorites list 2212 including location information regarding frequently visiting destinations such as home, office, school, etc., stored in the memory of the mobile device 2000. In an embodiment of the disclosure, the favorites list 2212 may further include a GUI for adding a frequently visiting destination.

Figure 6C:
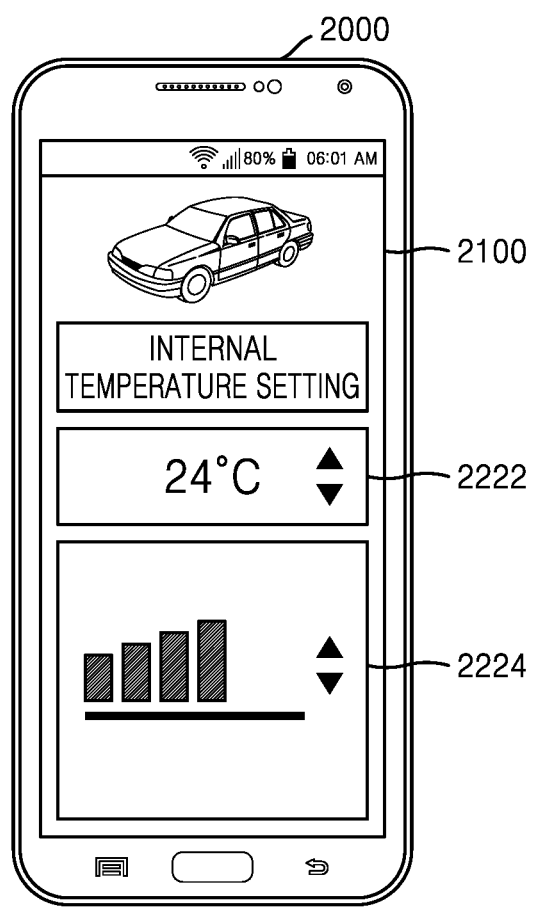
FIG. 6C shows an exemplary embodiment of a graphical user interface (GUI) for obtaining environment configuration information of a vehicle by execution of an application by a mobile device, according to an embodiment of the disclosure.

The second GUI 2220 may be a user interface for receiving a user input to set the internal temperature of the vehicle. FIG. 6C shows an exemplary embodiment of a GUI for obtaining environment configuration information of a vehicle by execution of an application by the mobile device 2000 according to an embodiment of the disclosure. Referring to FIG. 6C together, the second GUI 2220 may include a temperature setting UI 2222 for receiving a user input to set the temperature of the air conditioner of the vehicle and a wind strength UI 2224 for receiving a user input to control the wind strength of the air conditioner. In an embodiment of the disclosure, the second GUI 2220 may further include a GUI for receiving a user input to set the temperature or power of the heater.

The third GUI 2230 may be a user interface for receiving a user input to set a configuration value regarding audio play back of the vehicle. In an embodiment of the disclosure, the third GUI 2230 may display a user interface for inputting a configuration value for controlling a setting related to playing of music recorded in a CD, a DVD, a Blu-ray disk, or a USB memory or playing of music streamed from the mobile device 2000 through wireless data communication such as Bluetooth, etc., or a user input for changing the configuration value. The third GUI 2230 may control at least one of, for example, music volume, sound field, or EQ (e.g., emphasis of low notes, mid-range notes, and high notes). In an embodiment of the disclosure, the third GUI 2230 may display a GUI for storing a combination of configuration values regarding music volume, sound field control, and EQ control as user presettings.

The fourth GUI 2240 may be a user interface configured to receive a user input for setting a configuration value that adjusts positions and angles of the backs of the driver seat, the front passenger seat, and the rear passenger seats. In an embodiment of the disclosure, the fourth GUI 2240 may display a GUI for adjusting the rear passenger seats and storing the adjusted positions and angles of the backs as user presettings.

The fifth GUI 2250 may be a user interface configured to receive a user input for setting a configuration value of lightings including lamps such as head lamps, rear combination lamps, fog lamps, etc., of the vehicle and internal lightings of the vehicle, etc.

The sixth GUI 2260 may be a user interface configured to receive a user input for initializing the configuration parameter value of the internal system of the vehicle into preset default values.

Figure 7A:
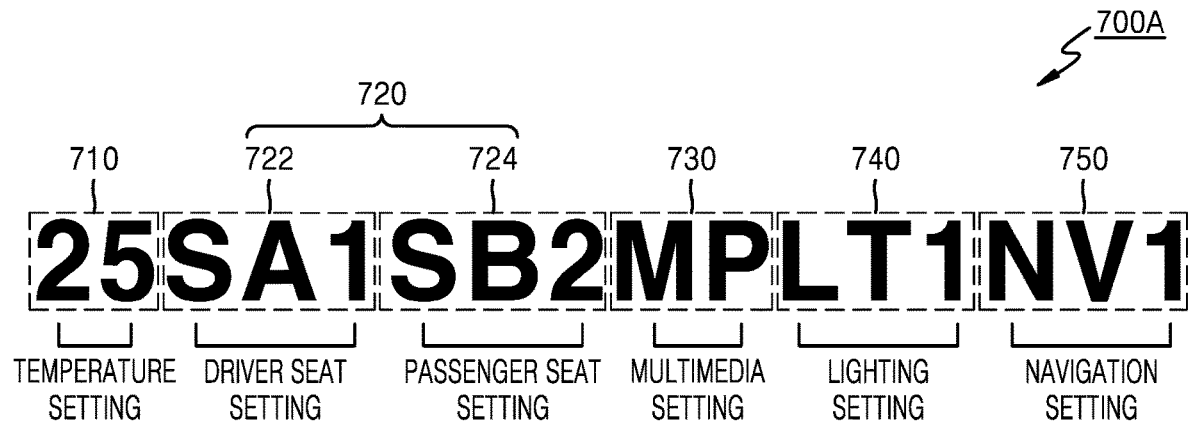
FIG. 7A illustrates an example of a wireless data communication ID of a mobile device according to an embodiment of the disclosure.

FIG. 7A illustrates an example of a wireless data communication ID of the mobile device 2000 according to an embodiment of the disclosure. The wireless data communication ID shown in FIG. 7A includes Bluetooth IDs 700A. Each of the Bluetooth IDs 700A, 700B, and 700C may include a character string including a total of 24 alphanumeric characters.

Referring to FIG. 7A, the Bluetooth ID 700A may include a character string of 24 characters. The character string of the Bluetooth ID 700A may include information regarding a configuration parameter value of the internal system of the vehicle. The Bluetooth ID 700A may include a first character string 710 indicating information about a temperature setting value, a second character string 720 indicating configuration value information regarding a position and an angle of a back of a seat, a third character string 730 indicating configuration value information regarding multimedia playback, a fourth character string 740 indicating configuration value information regarding internal lightings of the vehicle, and a fifth character string 750 indicating configuration information regarding a destination or a route of the navigation system.

Correlation between the plurality of character strings 710, 720, 730, 740, and 750 included in the Bluetooth ID 700A and configuration parameters of the internal system of the vehicle may be defined based on a preset rule which may be stored in the memory 1300 (see FIG. 2) of the electronic device 1000 in the form of an LUT. The LUT may include not only correlation between character strings and configuration parameter values, but also correlation between the character string and user presetting of the configuration parameter. For example, the correlation between the character string and the configuration parameter value of the internal system of the vehicle may be defined as shown in Table 1.

TABLE 1

| Character String | Configuration Parameter Value of Internal System of Vehicle |
| --- | --- |
| Two Digits (e.g., 24, 25, etc.) | Air conditioner Temperature |
| SA1 | Preset #1 of Position and Back of Driver Seat |
| SA2 | Preset #2 of Position and Back of Driver Seat |
| SB1 | Presetting #1 of Position and Back of Front Passenger Seat |
| SB2 | Presetting #2 of Position and Back of Front Passenger Seat |
| MP | Play Music |
| DP | Play Digital Broadcasting |
| LT1 | Presetting #1 of Lighting Setting |
| LT2 | Presetting #2 of Lighting Setting |
| NV1 | Destination #1 from Navigation Favorites List |
| NV2 | Destination #2 from Navigation Favorites List |

For example, when the Bluetooth ID 700A is '25SA1SB2MPLT1NV1', the first character string 710 '25' may indicate a set temperature of the air conditioner, the second character string 722 'SA1' may indicate a user presetting #1 of the position and angle of the back of the driver seat, the second character string 724 'SB2' may indicate a user presetting #2 of the position and angle of the back of a rear passenger seat, the third character string 730 'MP' may indicate playing of music, the fourth character string 740 'LT1' may indicate a user presetting #1 for internal lighting, and the fifth character string 750 'NV1' may indicate a destination #1 from a navigation favorites list.

However, Table 1 is merely an example for convenience of a description, and correlation between character strings and configuration parameter values of the internal system of the vehicle described in the disclosure may not be limited as defined in Table 1.

In an embodiment of the disclosure, the processor 1200 (see FIG. 2) of the electronic device 1000 may interpret the Bluetooth ID of the mobile device 2000 by referring to the LUT of Table 1 stored in the memory 1300 (see FIG. 2) and obtain information about the configuration parameter value of the internal system of the vehicle as a result of the interpretation.

In an embodiment of the disclosure, the Bluetooth ID may include a character string corresponding to a configuration parameter changed from a final configuration value.

Figure 7B:
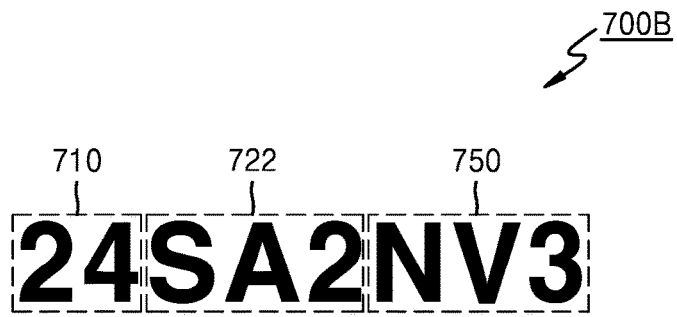
FIG. 7B illustrates an example of a wireless data communication ID of a mobile device according to an embodiment of the disclosure.

FIG. 7B illustrates an example of a wireless data communication ID of the mobile device 2000 according to an embodiment of the disclosure. The wireless data communication ID shown in FIG. 7B includes Bluetooth IDs 700B.

Referring to FIG. 7B, a Bluetooth ID 700B may include the first character string 710 related to a setting of the temperature of the air conditioner, the second character string 722 related to user presettings of a position and an angle of a back of a driver seat, and the fifth character string 750 related to a destination included in a navigation favorites list. In an embodiment of the disclosure shown in FIG. 7B, the Bluetooth ID 700B may include only information about configuration parameter values that are changed by the user. For example, the Bluetooth ID 700B may be an ID generated by the mobile device 2000 when the air conditioner setting temperature is adjusted to about 24□, the user settings of the position and angle of the back of the driver seat are changed to a presetting #2, and the destination of the navigation system is changed to a destination #3 of the favorites list.

Figure 7C:
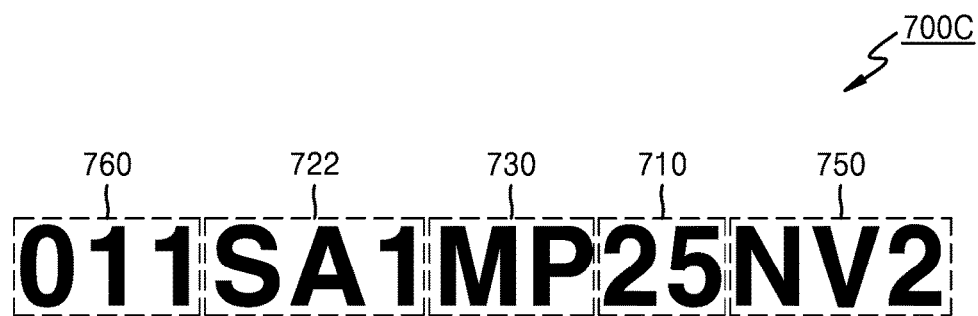
FIG. 7C illustrates an example of a wireless data communication ID of a mobile device according to an embodiment of the disclosure.

FIG. 7C illustrates an example of a wireless data communication ID of the mobile device 2000 according to an embodiment of the disclosure. The wireless data communication ID shown in FIG. 7C includes Bluetooth IDs 700C. Referring to FIG. 7C, a Bluetooth id 700C may further include a serial number 760 indicating information about an arrangement order of character strings indicating configuration parameters of the internal system of the vehicle and a combination of the configuration parameters. In an embodiment of the disclosure, the serial number 760 may include, but not limited to three digits. In another embodiment of the disclosure, the serial number 760 may include a plurality of character strings of one digit, two digits, or four or more digits, and may also include English characters as well as numbers. For example, the serial number 760 may define the combination of a plurality of configuration parameter values of the internal system of the vehicle and the arrangement order of the character strings, according to rules defined in Table 2.

TABLE 2

| Serial Number | Combination of Configuration Parameters and Arrangement Order of Character Strings |
|---|---|
| 010 | Driver Seat Presetting, Music Playing, Air conditioner Temperature |
| 011 | Driver Seat Presetting, Music Playing, Air conditioner Temperature, Navigation Favorites Destination |
| 012 | Driver Seat Presetting, Front Passenger Seat Presetting, Air conditioner Temperature, Navigation Favorites Destination |
| 013 | Air conditioner Temperature, Driver Seat Presetting, Front Passenger Seat Presetting, Navigation Favorites Destination |
| 014 | Navigation Favorites Destination, Air conditioner Temperature, Driver Seat Presetting, Front Passenger Seat Presetting |
| . . . | . . . |

For example, when the Bluetooth ID 700C is '011SA1MP25NV2', the serial number 760 is '011', such that character strings of the Bluetooth ID 700C other than the serial number 760 may be arranged in the order of the second character string 722 indicating information about the driver seat presetting, the third character string 730 indicating configuration information about music playing, the first character string 710 indicating the configuration information related to the air conditioner temperature, and the fifth character string 750 indicating an identification value of a destination of the navigation favorites list. Thus, in the Bluetooth ID 700C, 'SA1' may indicate the user presetting #1 of the position of and the angle of the back of the driver seat, 'MP' may indicate music playing, '25' may indicate the setting temperature of the air conditioner, and 'NV2' may indicate destination #2 from the navigation favorites list.

However, Table 2 is merely an example for convenience of a description, and the combination of the serial number 760 and the configuration parameter values and the arrangement order of the character strings described in the disclosure may not be limited as defined in Table 1.

FIG. 8 is a flowchart showing an operating method of the electronic device 1000 according to an embodiment of the disclosure.

Operations S810 through S860 shown in FIG. 8 may be operations performed prior to operation S410 shown in FIG. 4. Operations S840 and S870 may be a more specific embodiment of operation S410 shown in FIG. 4.

In operation S810, the electronic device 1000 may detect turning-on of the vehicle.

In operation S820, the electronic device 1000 may search for a mobile device in the registered-device database 1600 (see FIG. 2) based on MAC address. In an embodiment of the disclosure, the electronic device 1000 may search for the mobile device 2000 of the user from a previously registered mobile device list stored in the registered-device database 1600 when the electronic device 1000 detects turning-on of the vehicle. The registered-device database 1600 may be a database that stores device identification information and MAC addresses of the previously registered mobile devices 2000.

In operation S830, the electronic device 1000 may identify whether one mobile device is found as a result of the search. The electronic device 1000 may identify the number of mobile devices previously registered in the registered-device database 1600 and identify a single mobile device among the previously-registered mobile devices based on the MAC address of the one mobile device.

When the single mobile device 2000 is found, the electronic device 1000 may identify a wireless data communication ID of the found mobile device 2000, in operation S840.

When a plurality of mobile devices are found, the electronic device 1000 may display a pop-up menu for selecting a mobile device of the driver among the plurality of found mobile devices or output a voice message, in operation S850. In an embodiment of the disclosure, the processor 1200 (see FIG. 2) of the electronic device 1000 may display a list of the plurality of found mobile devices on the display 1510 (see FIG. 2) and display a GUI for selecting a mobile device of the driver from the list. The GUI may be displayed on the display 1510 in the form of a pop-up menu.

In another embodiment of the disclosure, the processor 1200 may output a voice message for selecting the mobile device of the driver from the list of the plurality of found mobile devices through the sound output module 1520 (see FIG. 2). The voice message may be a message that induces selection of the mobile device of the driver like "Select Device of Driver between Found Device #1 and Device #2".

In operation S860, the electronic device 1000 may determine the mobile device 2000 of the driver from among the plurality of mobile devices, based on a user input responding to the pop-up menu or the voice message. In an embodiment of the disclosure, the processor 120 may receive a user input to select any one mobile device from among the plurality of mobile devices through the user input interface 1400 (see FIG. 2) and determine the mobile device 2000 of the driver based on the received user input. For example, the processor 1200 may determine the mobile device 2000 of the driver by receiving a user's touch input or a user input of pressing a button to select any one mobile device from the list of the plurality of mobile devices displayed through the pop-up menu. In another example, the processor 1200 may receive a response message through a microphone that receives a voice input like user's utterance, and interpret the response message using a natural language understanding model to determine the mobile device 2000 of the driver.

While it is described in operations S850 and S860 that the mobile device 2000 of the driver is determined among the plurality of mobile devices based on the user input responding to the pop-up menu or the voice message, the embodiment of the disclosure may not be necessarily limited to a need for the user input.

According to an embodiment of the disclosure, the electronic device 1000 may recognize the face or a fingerprint of the driver to identify the driver, and automatically determine the mobile device 2000 of the identified driver without a user input. In an embodiment of the disclosure, the electronic device 1000 may include a camera arranged on the driver's seat and photograph the face of the driver sitting on the driver's seat by using the camera. The processor 1200 (see FIG. 2) of the electronic device 1000 may obtain a captured image of the face of the driver from the camera and compare the obtained facial image with previously registered reference facial images to recognize the facial image of the driver. For the face recognition method, known image processing techniques may be used, without being limited thereto. The electronic device 1000 may recognize the face of the driver by using a previously trained neural network.

In another embodiment of the disclosure, the electronic device 1000 may include a fingerprint recognition sensor. The electronic device 1000 may obtain a driver's fingerprint through the fingerprint recognition sensor and compare the obtained fingerprint of the driver with previously registered reference fingerprints to identify the driver. The fingerprint recognition sensor may be arranged on the start button of the vehicle, without being limited thereto.

The electronic device 1000 may identify the driver through face recognition or fingerprint recognition, and automatically determine the mobile device 2000 of the driver based on previously stored driver device information. The driver device information may include device identification information (e.g., a device ID) and MAC address information of the previously registered mobile device 2000 of the driver. When the plurality of mobile devices are found, the processor 1200 may obtain device information and MAC address information of each of the plurality of mobile devices and compare the driver device information with the MAC address of the previously stored device to identify the mobile device 2000 of the driver. In an embodiment of the disclosure, the driver device information may be stored in the registered-device database 1600 (see FIG. 2).

In operation S870, the electronic device 1000 may identify a wireless data communication ID of the mobile device 2000 of the determined driver.

Operations S840 and S870 may be a more specific embodiment of operation S410 of FIG. 4, in which different operations are performed depending on whether one or more mobile devices are detected. The wireless data communication ID identified in operations S840 and S870 may be a Bluetooth ID or a WiFi device name.

FIG. 9 is a flowchart showing operations of the electronic device 1000 and the mobile device 2000 according to an embodiment of the disclosure. Operations shown in FIG. 9 may be operations performed after execution of operation S430 shown in FIG. 4.

In operation S910, the electronic device 1000 may perform pairing with the mobile device 2000. In operation S912, the mobile device 2000 may perform pairing with the electronic device 1000. In an embodiment of the disclosure, the processor 1200 (see FIG. 2) of the electronic device 1000 may perform Bluetooth pairing with the mobile device 2000 by using the wireless communication module 1100 (see FIG. 2). The wireless communication module 1100 may include a Bluetooth transmission/reception module. After Bluetooth pairing is performed between the electronic device 1000 and the mobile device 2000, the processor 1200 may obtain a device identification value (e.g., a device ID) and a MAC address from the mobile device 2000.

In operation S920, the mobile device 2000 may change environment configuration information of the vehicle according to a user input. In an embodiment of the disclosure, the mobile device 2000, by executing the application, may display a GUI for changing at least one of the configuration parameter values of the internal system of the vehicle such as internal temperature setting of the vehicle, destination or route setting of the navigation system, seat settings of the driver and passenger, multimedia operation setting, internal lighting setting of the vehicle, CID setting, or dashboard setting, and change a configuration parameter value based on the user input received through the GUI. The mobile device 2000 may generate new environment configuration information of the vehicle by combining the changed configuration parameter values.

In operation S930, the mobile device 2000 may transmit the changed environment configuration information of the vehicle to the electronic device 1000, by using the wireless communication module. The wireless communication module may be, for example, a Bluetooth transmission/reception module. In an embodiment of the disclosure, the electronic device 1000 may receive the environment configuration information from the paired mobile device 2000 by using the Bluetooth transmission/reception module.

In operation S940, the electronic device 1000 may change the configuration value of the internal system of the vehicle based on the configuration value of the received environment configuration information.

Figure 10:
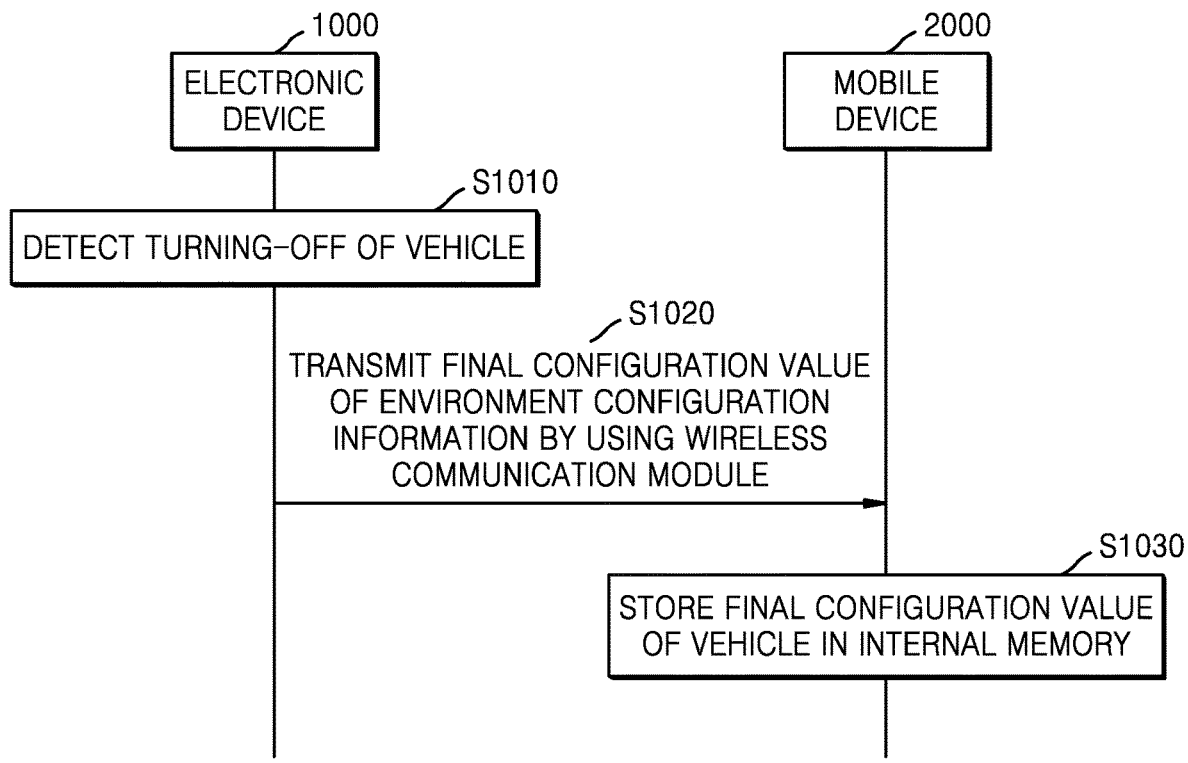
FIG. 10 is a flowchart showing operations of an electronic device and a mobile device, according to an embodiment of the disclosure.

FIG. 10 is a flowchart showing operations of the electronic device 1000 and the mobile device 2000 according an embodiment of to the disclosure. Operations shown in FIG. 10 may be operations performed after execution of operation S940 shown in FIG. 9.

In operation S1010, the electronic device 1000 may detect turning-off of the vehicle.

In operation S1020, the electronic device 1000 may transmit a final configuration value of the environment configuration information of the vehicle to the mobile device 2000 by using the wireless communication module. In an embodiment of the disclosure, the electronic device 1000 may transmit information about at least one of configuration parameter values of the internal system of the vehicle, set immediately prior to turning-off of the vehicle, e.g., a final configuration value of the internal temperature of the vehicle, a destination or route setting of the navigation system, a final configuration value of the position and the angle of the back of the seats of the driver and the passenger, a final configuration value of the CID, or a final configuration value of the dashboard to the mobile device 2000. The final configuration value of the configuration parameter value of the internal system of the vehicle may include at least one of a configuration value set or changed through the mobile device 2000 or a configuration value changed through manipulation of the vehicle. In an embodiment of the disclosure, the electronic device 1000 may transmit a final configuration value of the environment configuration information of the vehicle to the mobile device 2000 by using the Bluetooth transmission/reception module.

In operation S1030, the mobile device 2000 may store final configuration value information of the vehicle in an internal memory. In an embodiment of the disclosure, the mobile device 2000 may the final configuration value information of the environment configuration information received from the electronic device 1000 in the memory of the mobile device 2000. The final configuration value information stored in the mobile device 2000 may be changed to the wireless data communication ID when the driver gets in the vehicle later.

A program executed by the electronic device 1000 or the mobile device 2000 described in the specification may be implemented by a hardware component, a software component, and/or a combination of the hardware component and the software component. A program may be executed by any system capable of executing computer-readable instructions.

Software may include a computer program, a code, an instruction, or a combination of one or more thereof, and may configure a processing device to operate as desired or independently or collectively instruct the processing device.

Software may be implemented as a computer program including an instruction stored in a computer-readable storage media. Examples of the computer-readable recording medium may include magnetic storage media (e.g., read-only memory (ROM), random-access memory (RAM), floppy disks, and hard disks) and optical recording media (e.g., compact disc-ROM (CD-ROM) and digital versatile discs (DVDs)). The computer-readable recording medium may also be distributed over network coupled computer systems so that a computer-readable code is stored and executed in a distributed fashion. The medium may be read by a computer, stored in a memory, and executed by a processor.

The computer-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A program according to embodiments of the disclosure disclosed in the specification may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of an S/W program electronically distributed through a manufacturer or the device or an electronic market (e.g., Google Play Store or App Store). For the electronic distribution, at least a part of the software program may be stored in a storage medium or temporarily generated. In this case, the storage medium may be a storage medium of a server in the manufacturer of the vehicle or the electronic device 1000, the server of the electronic market, or a relay server that temporarily stores a software program.

The computer program product may include a storage medium of a server or a storage medium of a device in a system including at least one of the electronic device 1000 or the mobile device 2000. Alternatively, when there is a third device (e.g., a smart phone) communicating with the electronic device 1000 or the mobile device 2000, the computer program product may include a storage medium of the third device. Alternatively, the computer program product may include a software program transmitted from the electronic device 1000 to the device or the third device or from the third device to the device.

In this case, one of the electronic device 1000, the mobile device 2000, and the third device may execute the method according to embodiments of the disclosure by executing the computer program product. Alternatively, two or more of the electronic device 1000, the mobile device 2000, and the third device may execute the computer program product to execute the method according to the embodiments of the disclosure in a distributed manner.

For example, the electronic device 1000 may execute the computer program product stored in the memory 1300 (see FIG. 2) to control the mobile device 2000 communication-connected with the electronic device 1000 to perform the method according to the embodiments of the disclosure.

In another example, the third device may execute the computer program product to control the device communicating with the third device to perform the method according the embodiment of the disclosure.

When the third device executes the computer program product, the third device may download the computer program product from the electronic device 1000 and execute the downloaded computer program product. Alternatively, the third device may execute a computer program product provided in a preloaded state to execute the method according to the disclosed embodiments.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the embodiments of the disclosure have been described in connection with specific examples and drawings, it would be understood by a person skilled in the art that various modifications and changes may be possible from the foregoing disclosure. For example, even when described techniques are performed in a sequence different from the described method and/or components such as computer systems, modules, etc., are combined or connected differently from the described method, or replaced with other components or equivalents, an appropriate result may be achieved.

What is claimed is:

1. A method, performed by an electronic device mounted on a vehicle, of controlling an internal system of the vehicle, the method comprising:
   receiving, from a mobile device, a wireless signal identifying a wireless data communication identifier (ID) of the mobile device, wherein the wireless data communication identifier comprises a string of characters;
   obtaining environment configuration information for the vehicle based on the string of characters of the wireless data communication identifier; and
   controlling a configuration of the internal system of the vehicle by using the obtained environment configuration information,
   wherein the string of characters of the wireless data communication identifier is correlated with the environment configuration information for the vehicle,
   wherein the string of characters of the wireless data communication identifier is user changeable based on changed parameter values of the environment configuration information, and
   wherein obtaining the environment configuration information for the vehicle comprises determining a first parameter value from a first portion of the string of characters and determining a second parameter value from a second portion of the string of characters, and changing a first setting of the vehicle to the first parameter value, and changing a second setting of the vehicle to the second parameter value.

2. The method of claim 1, wherein the wireless data communication ID comprises a Bluetooth ID and/or Wireless Fidelity (WiFi) name of the mobile device.

3. The method of claim 1, wherein the wireless data communication ID is generated, using an application executed by the mobile device, by converting the environment configuration information of the vehicle set by a user input, and the application includes instructions for converting the environment configuration information of the vehicle into the wireless data communication ID based on a preset rule.

4. The method of claim 1, wherein the environment configuration information comprises parameter values for an internal temperature setting of the vehicle, a navigation setting, drive and passenger seat settings, a multimedia operation setting, an internal lighting setting of the vehicle, a central information display (CID) setting, and/or a dashboard setting.

5. The method of claim 1, further comprising:
   detecting turning-on of the vehicle; and
   searching for a previously registered mobile device in a registered-device list stored in a memory, based on a medium access control (MAC) address of the mobile device.

6. The method of claim 5, wherein, when one mobile device is found as a result of the searching, the identified wireless data communication ID is a wireless data communication ID of the found one mobile device.

7. The method of claim 5, further comprising:
   determining a mobile device of a driver from among a plurality of mobile devices found as a result of the searching,
   wherein the identified wireless data communication ID is a wireless data communication ID of the determined mobile device of the driver.

8. The method of claim 7, wherein the determining of the mobile device of the driver comprises:
   displaying a pop-up menu for selecting the mobile device of the driver on a CID or outputting a voice message through a speaker; and
   selecting the mobile device of the driver from among the plurality of mobile devices, based on a user input responding to the pop-up menu or the voice message.

9. The method of claim 1, further comprising:
   performing pairing with the mobile device by using a wireless communication module;
   receiving a configuration value of changed environment configuration information from the paired mobile device, by using the wireless communication module; and
   changing the configuration of the internal system of the vehicle, based on the received configuration value.

10. The method of claim 1, further comprising:
    detecting turning-off of the vehicle; and
    transmitting configuration value information of the internal system of the vehicle to the mobile device by using a wireless communication module, when the vehicle is turned off.

11. An electronic device mounted on a vehicle, the electronic device comprising:
    a wireless communication module comprising a Bluetooth transmission/reception module and/or a Wireless Fidelity (WiFi) module and configured to wirelessly perform data communication with a mobile device;
    a memory storing a program comprising one or more instructions for controlling the electronic device; and
    a processor configured to execute the one or more instructions of the program stored in the memory,
    wherein the processor is further configured to:
      identify a wireless data communication identifier (ID) of the mobile device, wherein the wireless data communication identifier comprises a string of characters;

obtain environment configuration information of the vehicle, based on the string of characters of the wireless data communication identifier; and control a configuration of an internal system of the vehicle by using the obtained environment configuration information, wherein the string of characters of the wireless data communication identifier is correlated with the environment configuration information for the vehicle, and wherein the string of characters of the wireless data communication identifier is user changeable based on changed parameter values of the environment configuration information, and wherein obtaining the environment configuration information for the vehicle comprises determining a first parameter value from a first portion of the string of characters and determining a second parameter value from a second portion of the string of characters, and changing a first setting of the vehicle to the first parameter value, and changing a second setting of the vehicle to the second parameter value.

12. The electronic device of claim 11, wherein the wireless data communication ID is generated, using an application executed by the mobile device, by converting the environment configuration information of the vehicle set by a user input, and the application includes instructions for converting the environment configuration information of the vehicle into the wireless data communication ID based on a preset rule.

13. The electronic device of claim 11, wherein the environment configuration information comprises parameter values for an internal temperature setting of the vehicle, a navigation setting, drive and passenger seat settings, a multimedia operation setting, an internal lighting setting of the vehicle, a central information display (CID) setting, and/or a dashboard setting.

14. The electronic device of claim 11, further comprising a database storing device identification information and a medium access control (MAC) address of at least one mobile device, and the processor is further configured to detect turning-on of the vehicle, obtaining a MAC address of the mobile device from the wireless communication module, and searching for the mobile device in the database based on the obtained MAC address.

15. The electronic device of claim 14, wherein, when one mobile device is found as a result of the searching, the identified wireless data communication ID is a wireless data communication ID of the found one mobile device.

16. The electronic device of claim 14, wherein the processor is further configured to determine a mobile device of a driver from among a plurality of mobile devices when the plurality of mobile devices are found as a result of the searching, and the identified wireless data communication ID is a wireless data communication ID of the determined mobile device of the driver.

17. The electronic device of claim 16, further comprising:
a display; and
a user input interface,
wherein the processor is further configured to display a graphical user interface (GUI) for selecting the mobile device of the driver on the display and select the mobile device of the driver from among the plurality of mobile devices, based on a user input received through the user input interface in response to displaying the GUI.

18. The electronic device of claim 11, wherein the processor is further configured to:
perform pairing with the mobile device by using the wireless communication module;
receive a configuration value of changed environment configuration information from the paired mobile device, by using the wireless communication module; and
change the configuration of the internal system of the vehicle, based on the received configuration value.

19. The electronic device of claim 11, wherein the processor is further configured to detect turning-off of the vehicle, and control the wireless communication module to transmit configuration value information of the internal system of the vehicle to the mobile device when the vehicle is turned off.

20. A non-transitory computer-readable storage medium having recorded thereon instructions that, when executed by an electronic device mounted on a vehicle, cause the electronic device to:
receive, from a mobile device, a wireless signal identifying a wireless data communication identifier (ID) of the mobile device, wherein the wireless data communication identifier comprises a string of characters;
obtain environment configuration information for the vehicle based on the string of characters of the wireless data communication identifier; and
control a configuration of an internal system of the vehicle by using the obtained environment configuration information,
wherein the string of characters of the wireless data communication identifier is correlated with the environment configuration information for the vehicle,
wherein the string of characters of the wireless data communication identifier is user changeable based on changed parameter values of the environment configuration information, and
wherein obtaining the environment configuration information for the vehicle comprises determining a first parameter value from a first portion of the string of characters and determining a second parameter value from a second portion of the string of characters, and changing a first setting of the vehicle to the first parameter value, and changing a second setting of the vehicle to the second parameter value.

* * * * *